United States Patent [19]

Plahn et al.

[11] Patent Number: 5,563,802
[45] Date of Patent: Oct. 8, 1996

[54] GENERATOR POWER SYSTEM AND METHOD

[75] Inventors: Paul H. Plahn, Plymouth; David J. Koenig, Wyoming; Mike C. Miller, Coon Rapids, all of Minn.

[73] Assignee: Onan Corporation, Minneapolis, Minn.

[21] Appl. No.: 594,779

[22] Filed: Jan. 31, 1996

Related U.S. Application Data

[63] Continuation of Ser. No. 187,600, Jan. 26, 1994, abandoned.

[51] Int. Cl.$^6$ .................... H02J 5/00; H02J 9/00
[52] U.S. Cl. .................. 364/492; 307/64; 307/65; 290/1 R
[58] Field of Search ................ 290/1 R; 307/64, 307/65, 66, 67, 75; 364/492, 494

[56] References Cited

U.S. PATENT DOCUMENTS

| | | | |
|---|---|---|---|
| 3,050,635 | 8/1962 | Tanner | 307/64 |
| 3,348,060 | 10/1962 | Jamieson | 307/66 |
| 3,514,625 | 5/1970 | Lane | 307/67 |
| 3,665,495 | 5/1972 | Carter et al. | 307/67 |
| 4,150,300 | 4/1979 | Van Winkle | 90/1 R X |
| 4,203,041 | 5/1980 | Sachs | 307/67 |
| 4,262,212 | 4/1981 | Jacob et al. | 307/9.1 |
| 4,465,943 | 8/1984 | Risberg | 307/67 |
| 4,916,329 | 4/1990 | Dang et al. | 307/66 |
| 5,053,635 | 10/1991 | West | 307/67 |
| 5,155,672 | 10/1992 | Brown | 363/43 |
| 5,198,698 | 3/1993 | Paul et al. | 307/64 |
| 5,241,217 | 8/1993 | Severinsky | 307/64 |
| 5,369,353 | 11/1994 | Erdman | 323/207 |

OTHER PUBLICATIONS

Rob Wilson, "Generator Eliminates Need for Synchronous Engine Speed", Diesel Progress, p. 14 (published before the filing date of this case).

*Primary Examiner*—Edward R. Cosimano
*Attorney, Agent, or Firm*—Merchant, Gould, Smith, Edell, Welter & Schmidt, P.A.

[57] ABSTRACT

An integrated power system includes an engine/generator power supply integrated with storage batteries to provide household-like AC power. For a small load demand, the storage batteries are used to provide electricity. For a large load demand, the engine/generator starts to supply electricity. The engine/generator also recharges the storage batteries if the load demand is smaller than the engine/generator maximum load capacity. For a larger load demand, both the engine/generator and the storage batteries supply electricity in parallel. The engine speed is variable for various loads. The bigger the load, the higher the engine speed is required to produce the necessary power and keep a constant high DC voltage.

20 Claims, 10 Drawing Sheets

POWER MANAGEMENT

GENERATOR POWER SYSTEM AND METHOD

This is a File Wrapper continuation application of application Ser. No. 08/187,600, filed Jan. 26, 1994, now abandoned.

FIELD OF THE INVENTION

The present invention relates to an electrical generator power system which includes an engine/generator set integrated with a direct current (DC) power supply.

BACKGROUND OF THE INVENTION

In many applications of electrical generator systems, load demand relative to generator power capacity is often low. However, in most generator systems, the engine/generator must be run even when only a small load is present.

Another problem with many electrical generator systems is that the speed of the internal combustion engine has to be operated at a constant high speed to provide power even though only a small electrical load is present. Thus, a substantially constant level of noise is created regardless of the load present.

In many applications, such as recreational vehicle (RV) applications or commercial mobile vehicles, storage batteries in conjunction with DC (direct current) to AC (alternating current) inverter circuitry are often used to provide "silent" power during periods of time when little or no noise is desired. However, the storage batteries can only be used for a limited period of time without any charging. After use of the storage batteries for a limited period of time, the engine/generator has to be run to provide the AC power which often creates an undesired level of noise.

While storage batteries can provide power for a limited period of time during low load demands, storage batteries typically do not supply sufficient power for high load demands, such as air conditioners (A/C) or a clothes washing machine, etc. Thus it is necessary to run the engine/generator to meet the relatively high load demands of these appliances. In addition, even for a small load, the storage batteries can only be used for a limited period of time as discussed above.

Engineers have designed so-called load management systems which control power distribution to various loads by varying the speed of the engine/generator set. When a new load is added into a power supply bus line, the load management system senses the additional load and requires more power from the engine/generator. In addition to other problems, one problem with these systems is that the engine at the reduced speed might not have the power to satisfy new load demands and unacceptable low voltage excursions be experienced.

Moreover, despite the fact that the speed of the generator set is varied, the engine/generator set is operated even when extremely low loads are present. Moreover, the engine/generator set typically has a top end speed which limits the electrical load it can support.

The present invention solves these and other problems associated with existing systems.

SUMMARY OF THE INVENTION

The present invention relates to a generator power system which integrates an engine/generator set with a DC power supply.

In one embodiment, DC batteries are used as a power resource when a small load, such as a light, a radio, etc., is present. The DC voltage output of the batteries is a low voltage, such as about 12 volts. The DC voltage output from the batteries is boosted or stepped up during a "boost stage" to a higher DC voltage, about 170 volts, by a boost transformer circuit. The high DC voltage is further inverted to an AC voltage by an inverter circuit, at about 120 volts RMS (root mean square), which is needed for many consumer appliances.

In one embodiment of the invention, an inverter circuit is present which includes switching transistors for the conversion of DC current from the battery source to AC current.

In one embodiment of the present invention, a high frequency inverter system is used to boost or increase the DC voltage provided by the batteries. DC voltage is drawn from the battery or batteries to a transformer with the primary transistors switching at a higher frequency to create an AC output. The AC output of the transformer secondary winding is rectified resulting in a high DC voltage, about 170 volts. To complete the inversion into AC power, the DC power is alternatively switched in an H-bridge inverter configuration of field effect transistors in an inverter circuit. This produces a quasi-sine wave output to a load bus.

In yet another embodiment, the DC power is inverted by an inverter circuit into a synthesized sine wave.

In one embodiment, the engine/generator is operated when the load is relatively high and the storage batteries cannot provide sufficient power. When the load demand is high, the DC voltage which is provided by the storage batteries starts to drop. Upon detecting this drop in voltage, the engine/generator starts to run and provides a DC voltage to keep the combined DC voltage output of the engine/generator and storage batteries constant. The greater the load, the faster the engine/generator runs. When the DC power generated by the engine/generator set is higher than the DC power provided from the storage batteries, the engine/generator set is also used to charge the storage batteries while providing DC power to the load bus. While the storage batteries are being charged, the storage batteries cannot be boosted so as to provide high voltage DC power, ultimately inverted to provide AC power to the electrical loads, and vice versa.

In one embodiment, the engine/generator also starts to run when the storage batteries are low on charge or potential energy and charges the storage batteries.

In one embodiment, when the load keeps increasing and reaches the maximum engine/generator's power supply capacity, the storage batteries stop being charged and enter the boost stage to assist the engine/generator in maintaining the high voltage DC bus and ultimately the AC power output of the integrated system.

In one embodiment, when the load reaches the maximum capacity of the engine/generator's power supply capacity, the speed of the engine/generator is fixed.

In one embodiment, the battery boost stage fulfills the need to improve performance of the system during load-on transient operation created when an electrical load is initially added to the load bus by boosting the storage batteries voltage to overcome any voltage deficiency or voltage undershoot of the system.

In one embodiment, the battery charge stage fulfills the need to improve performance of the system during load-off transient operation created when an electrical load is deleted from the load bus by charging battery to overcome any excess voltage or voltage overshoot of the system.

In one embodiment, a DC voltage sensor is used to sense the DC voltage at the input of the DC load bus to H-bridge inverter circuitry which converts the DC current into AC current for use by the AC loads such as appliances. The sensor sends an electrical signal to a microprocessor representative of the DC voltage so sensed, and the microprocessor controls the operating speed of the engine/generator set and the boost/charge status of the batteries to maintain the proper, constant DC voltage level on the high voltage, 170 volts, DC load bus.

In one embodiment, an AC voltage sensor is used to sense the AC voltage at the output of the H-bridge inverter circuitry. The AC voltage sensor sends an electrical signal representative of the AC voltage so sensed to the microprocessor. In response to this signal the microprocessor controls operation of the inverter circuitry so as to regulate the electrical output from the inverter circuitry to provide constant root mean square (RMS) AC voltage.

In one embodiment, a current sensor is used to sense the electrical current present at the output of the inverter. The current sensor sends an electrical signal representative of the electrical current so sensed to the microprocessor. In response to this signal, the microprocessor controls operation of the system in accordance with the varying electrical load demand which is present including transient conditions.

In one embodiment, a battery voltage sensor is used to sense an output voltage of the storage batteries. The battery voltage sensor sends an electrical signal to the microprocessor representative of the sensed battery output voltage, which controls charging of the batteries by use of suitable battery charger circuitry.

In one embodiment, a charging current sensor senses the charging current being input to the batteries. The charging current sensor sends an electrical signal representative of the sensed charging current to the microprocessor, and the microprocessor appropriately varies the charging current input to the batteries.

These and various other advantages and features of novelty which characterize the invention are pointed out with particularity in the claims annexed hereto and forming a part hereof. However, for a better understanding of the invention and its advantages and objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings in which like reference numerals and letters generally indicate corresponding parts throughout the several views.

DETAILED DESCRIPTION OF THE PREFERRED EMBODIMENT

Figure 1:
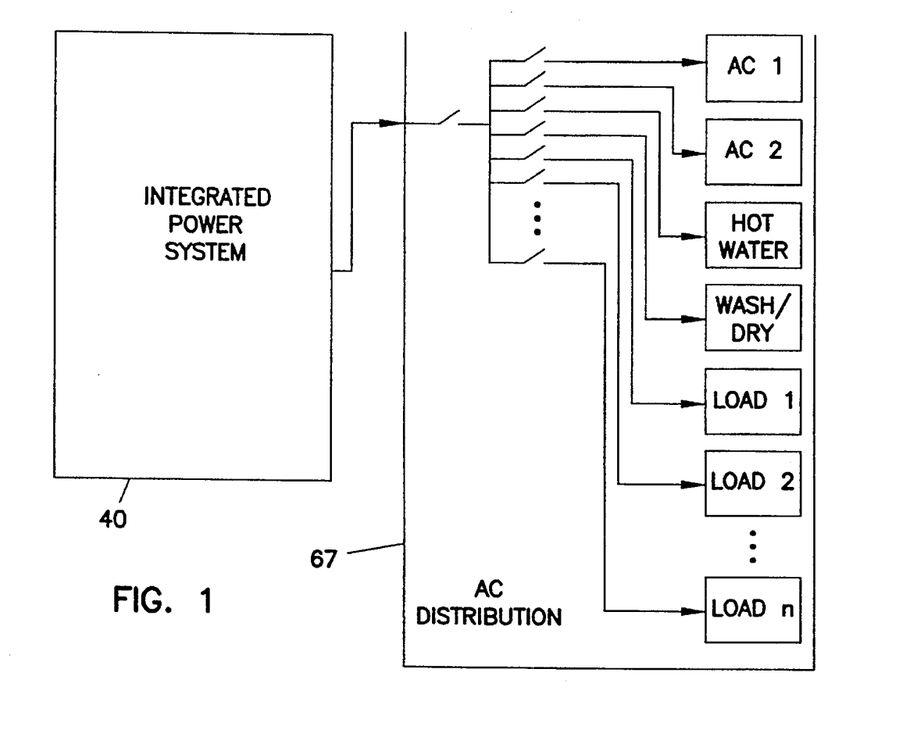
FIG. 1 is a functional block diagram of an integrated power system providing power to various AC loads in accordance with the principles of the present invention.

Referring now to the drawings, FIG. 1 shows an integrated power system 40 which provides AC power to various loads in accordance with the principles of the present invention. In this drawing the entire electrical load is generally represented by the reference numeral 67 which includes several different electrical loads which might typically be present in a system. It will be appreciated that the electrical loads might be of various types depending on the application. For example in the case of a recreational vehicle (RV), the electrical load will include the various appliances typically present in the RV such as air conditioners, furnaces, washer/dryers, lights, televisions, etc. The electrical power provided to these electrical devices is like typical household power; i.e. 120 volts RMS AC at 60 Hz.

Figure 2:
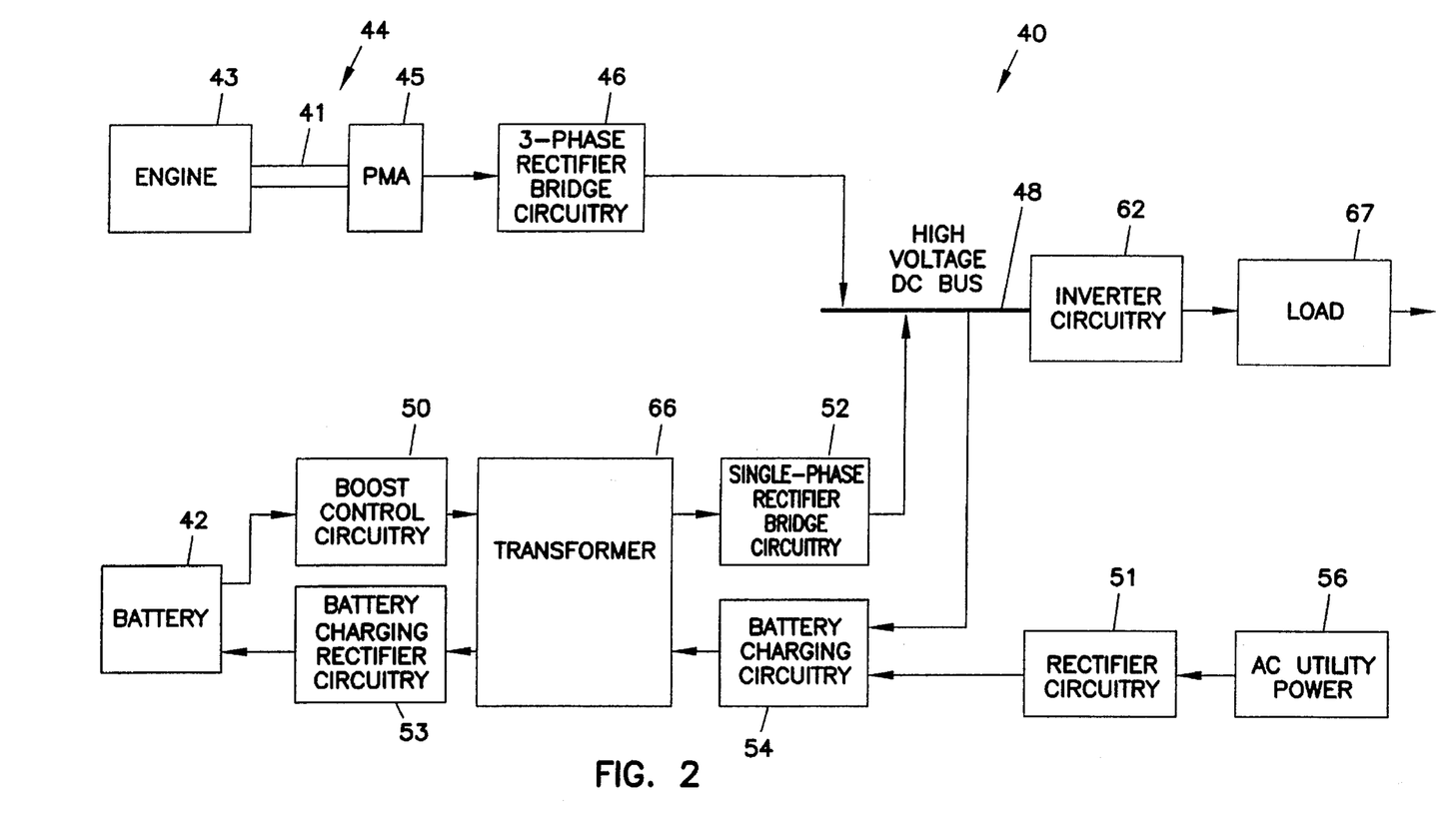
FIG. 2 is a functional block diagram of an integrated power system similar to that of FIG. 1 further showing inclusion of an engine/generator set and DC batteries in the integrated power system.
Figure 3:
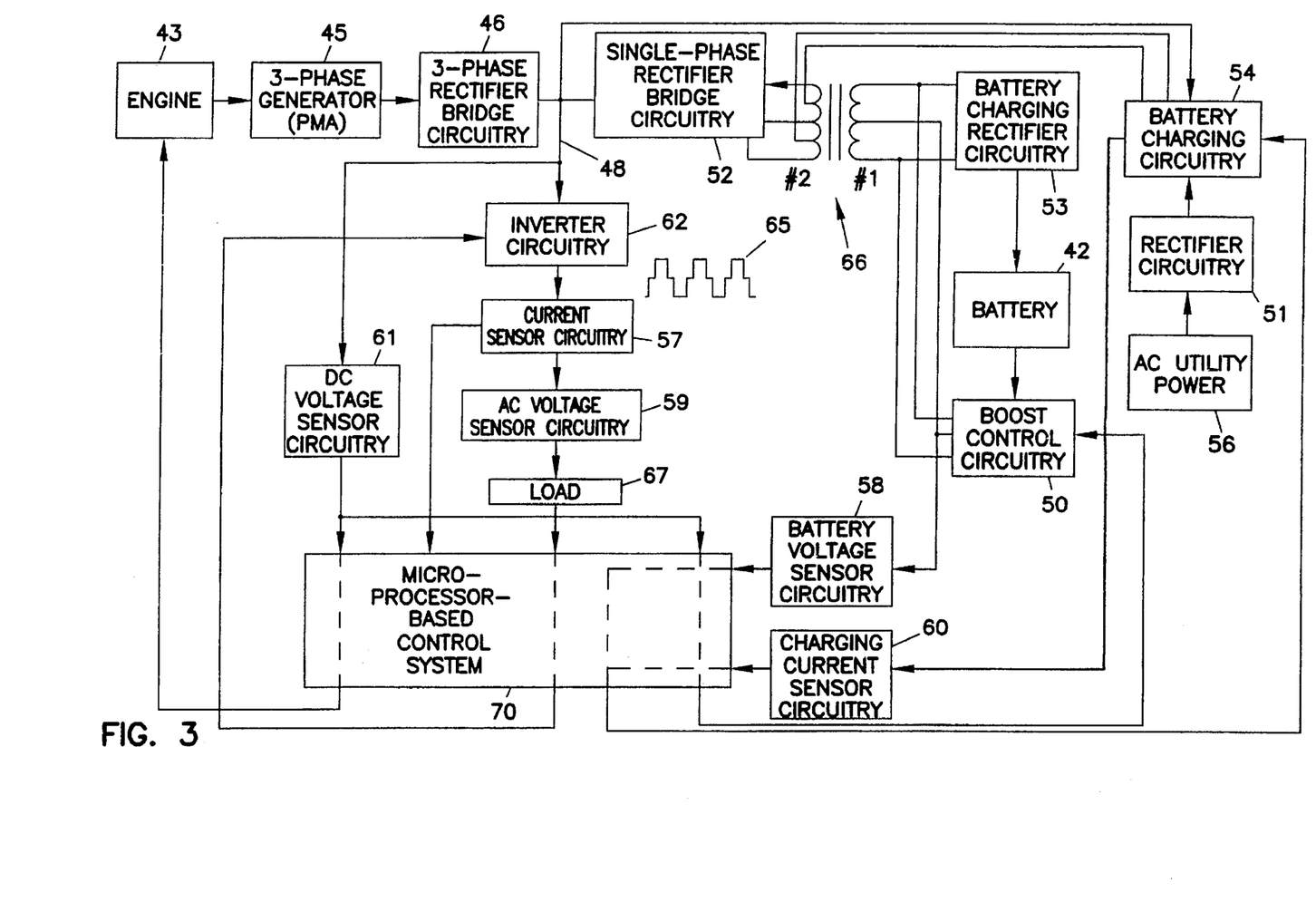
FIG. 3 is a functional block diagram of an integrated power system similar to that of FIG. 2 showing additional details.
Figure 4:
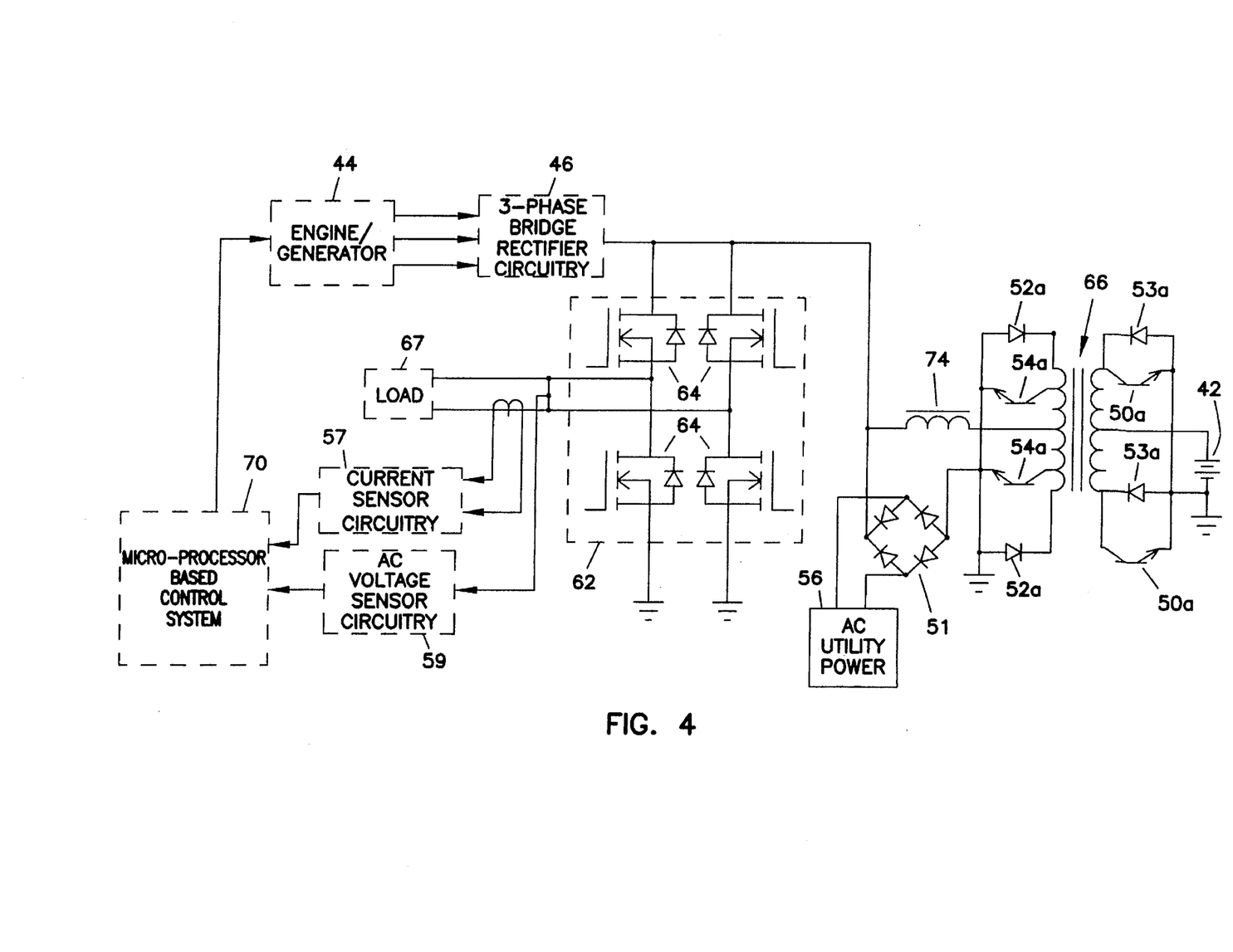
FIG. 4 is an electrical schematic diagram of battery boost circuitry, battery charging circuitry, and inverter circuitry of the integrated power system.
Figure 4A:
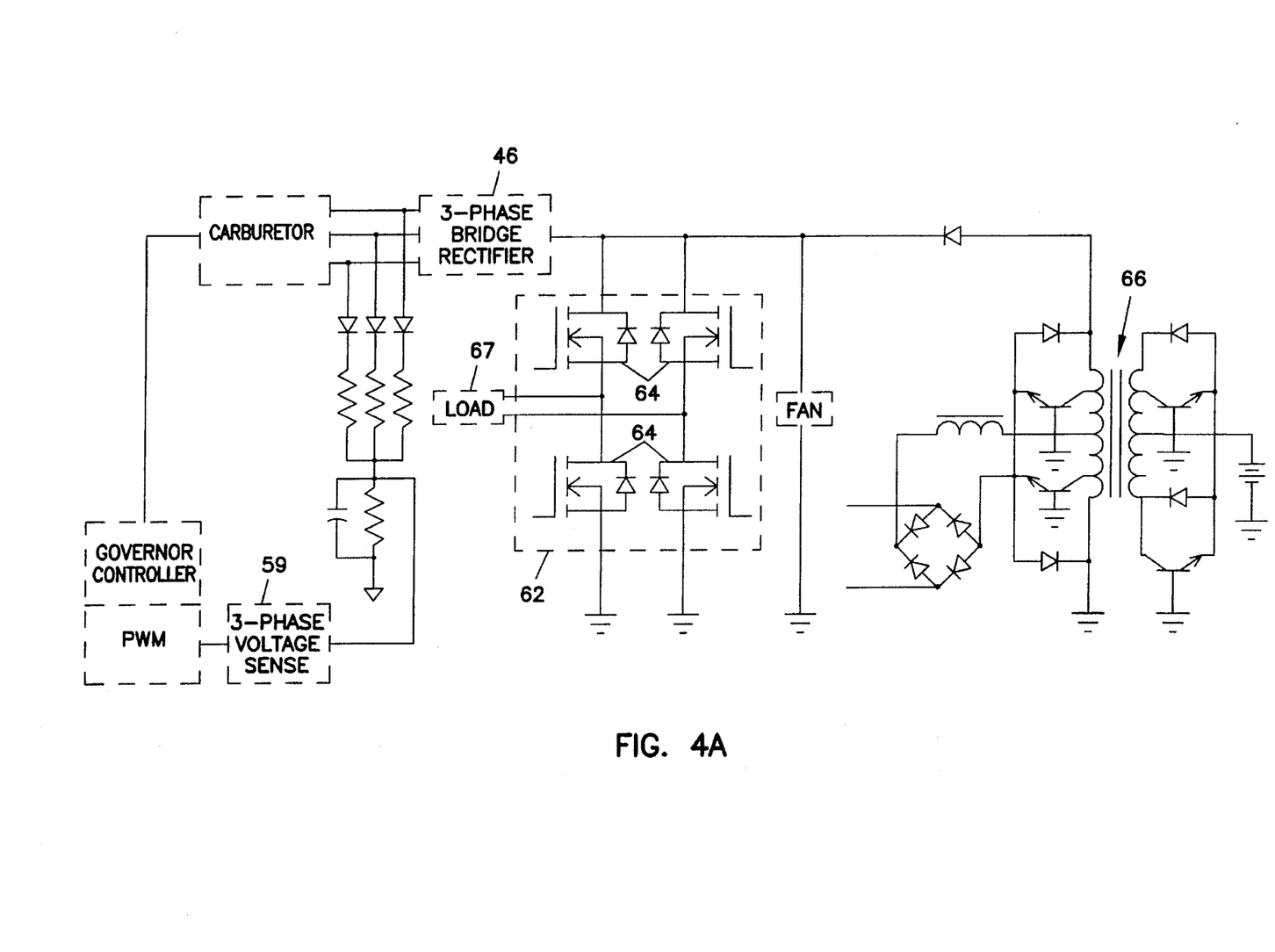
FIG. 4A is an electrical schematic diagram of a second embodiment of FIG. 4 showing battery boost circuitry, battery charging circuitry, and inverter circuitry of the integrated power system.

As shown more particularly in FIG. 2 thru FIG. 4, the integrated power system 40 includes two primary sources of power: storage battery or batteries 42 and an engine/generator set 44 including an engine 43 and a three phase permanent magnet alternator (PMA) 45 mounted on a drive shaft 41 of the engine 43. In the preferred embodiment, the engine is a reciprocating combustion engine such a gasoline or diesel engine and the alternator is of the permanent magnet variety. However, it will be appreciated that other engines might be used such as gas turbine engines and still be in keeping with the principles of the invention. Due to the somewhat limited speed range of a gas turbine engine, additional DC voltage regulatory control circuitry might have to be added to the system in order to provide additional regulation of the DC voltage. Moreover, the alternator might be a wound field alternator. With a wound field alternator, the DC voltage might be maintained at least in part by varying the excitation of the would field.

Figure 5A:
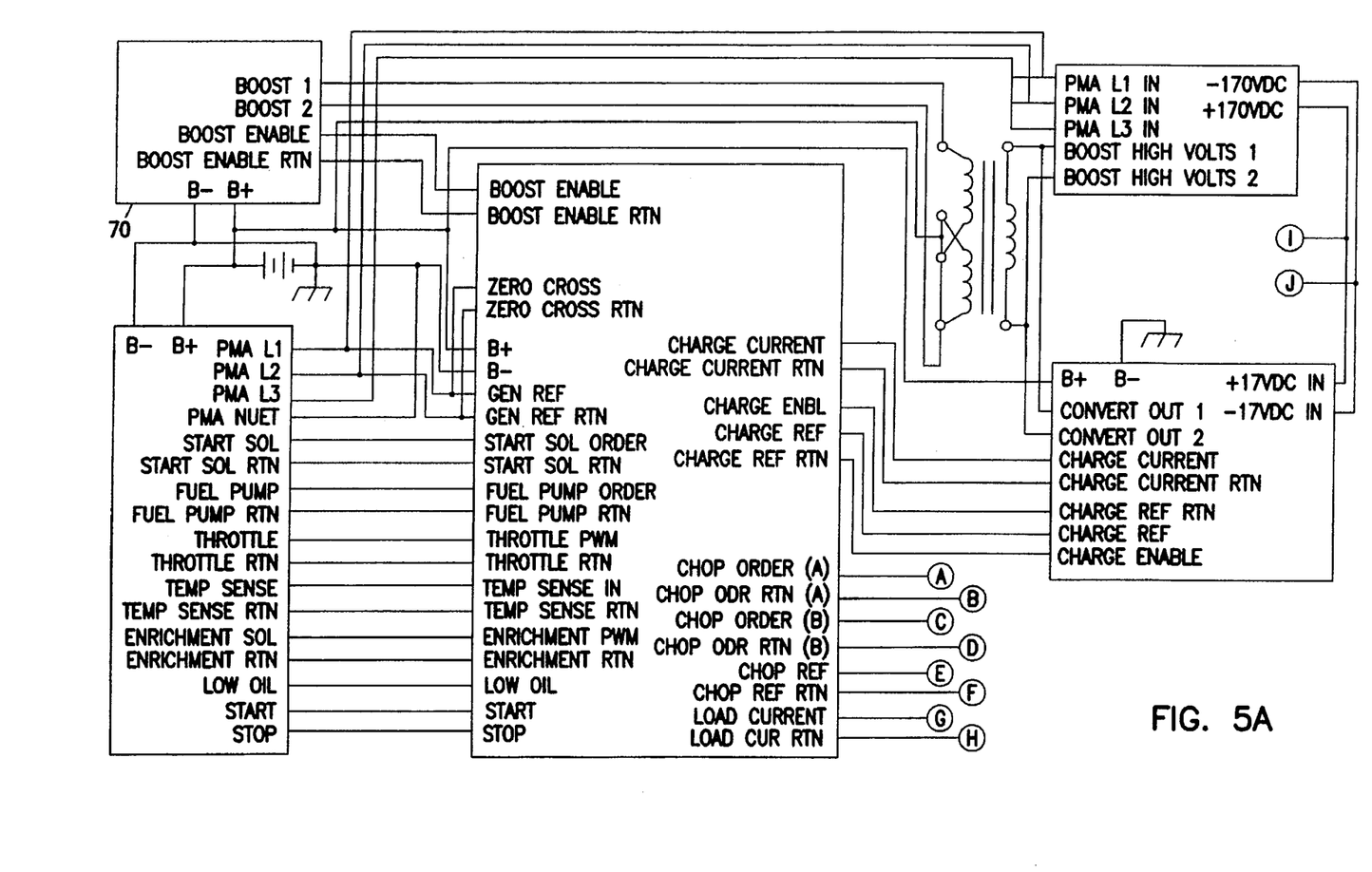
FIG. 5A and FIG. 5B are control signal diagrams of the integrated power system.
Figure 5B:
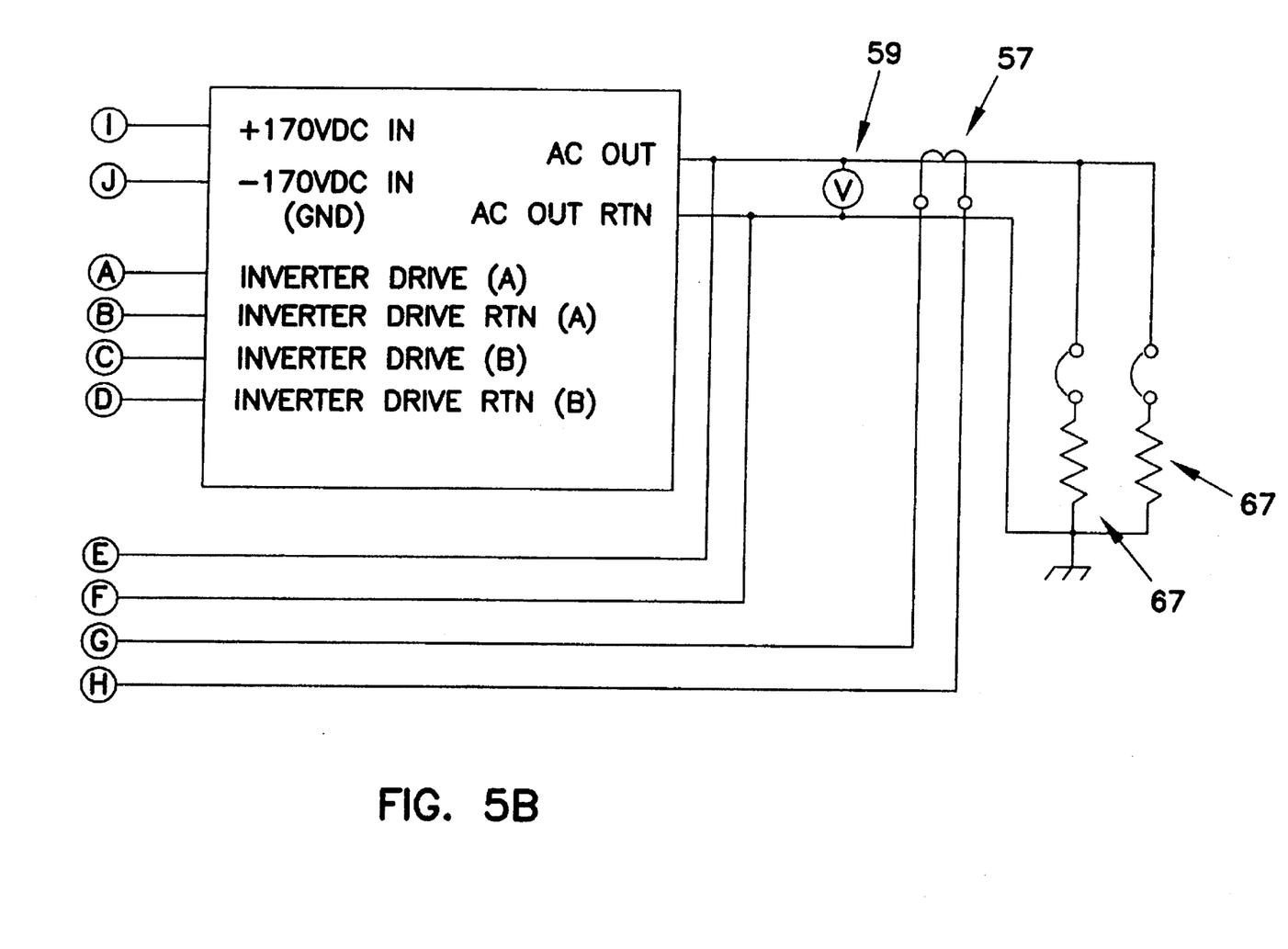

In the embodiment shown, the storage batteries 42 provide 12 volts DC power. The engine/generator set 44 and the batteries 42 are integrated under the control of a microprocessor based control system 70 (see FIG. 3) so as to form two compensationally integrated power resources. The control system 70 senses the electrical load status of the system and controls the power resource distribution between the storage batteries 42 and the engine/generator set 44. Illustrated in FIG. 5A and FIG. 5B are control signal diagrams of one embodiment of such a control system. It will be appreciated that this is but one embodiment and that various other control signal arrangements might be utilized.

Figure 7:
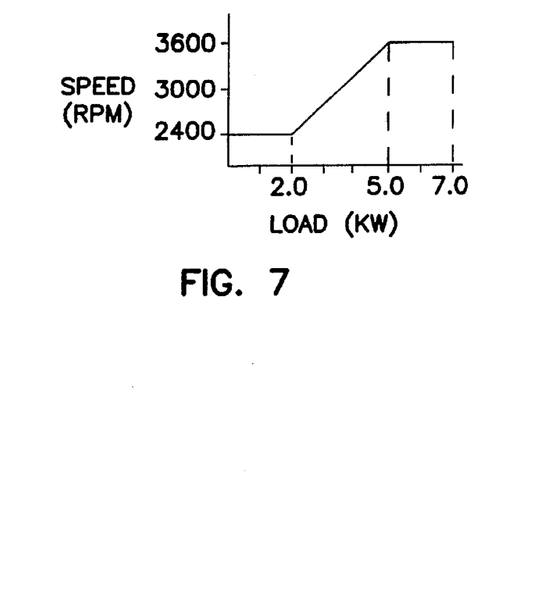
FIG. 7 is a diagram of output load vs. the engine speed of the engine generator power system.

As shown in FIG. 2 and FIG. 3, rectifier bridge circuitry 46 rectifies the sinewave of the three phase AC power output of the three-phase permanent magnet alternator (PMA) 45 into a square wave to provide about 170 volts DC to a high voltage DC bus 48. In one embodiment, this is a three-phase rectifier although other phase rectifiers might be used. The operating speed of the engine/generator set 44 is variable in response to the power requirements of the system. The larger the electrical load placed on the system such as when more appliances are added, the faster the engine/generator set 44 runs so that greater engine power is available and so that the 170 volt DC output is maintained when a permanent magnet alternator is used. FIG. 7 is an illustrative graph showing increasing engine/generator set 44 speed with increasing load. In the embodiment shown, the engine/generator set 44 has a fixed speed at its lower end and a fixed speed at its upper end. In between, the engine/generator set 44 might be increased in stair step fashion or be linearly increased as the load is increased.

The storage batteries 42 provide a similar high voltage DC power to the high voltage DC bus 48 only when the storage batteries 42 are used as a power resource in the power system 40. This will typically occur when there is a small electrical load on the system, which electrical demand the storage batteries 42 can satisfy without the assistance of the engine/generator set 44, or a large load for a very short duration, or when there is a large electrical load on the system requiring both the engine/generator set 44 and the storage batteries 42 to provide power together. The storage batteries 42 are boosted from 12 volts low DC power to 170 volts DC power by first inverting and boosting the DC current by use suitable boost circuitry 50 and then rectifying the resultant current into DC current by the use of suitable rectifier bridge circuitry 52. In one embodiment, single phase rectifier circuitry is used although other phase rectifiers might be used.

The storage batteries 42 have a limited capacity and after a period of use, the storage batteries 42 have to be charged. The integrated power system 40 uses the engine/generator set 44 to charge the storage batteries 42 through a battery charging circuitry 54. Alternatively, AC utility power 56 can be used to charge the storage batteries 42 through rectifier circuitry 51 and the charging circuitry 54. Battery voltage sensor circuitry 58 senses the voltage at the output of the storage batteries 42, and charging current sensor circuitry 60 senses a charging current at the input of the battery charging circuitry 54. Signals representing the sensed battery voltages and the battery charging currents are sent to the microprocessor based control system 70 which controls operation of the battery charging/converter circuitry 54.

The high voltage DC power on the high voltage DC bus 48 is inverted into AC power, usually 120 volts, by suitable inverter circuitry 62, and then distributed to the electrical load 67. AC voltage sense circuitry 59 senses the output of the inverter circuitry 62. A signal representative of the sensed AC voltage is sent to the microprocessor control system 70. The microprocessor control system 70 in response thereto generates a pair of PWM (pulse width modulated) signals (one for each half cycle) to control the AC output voltage of the inverter circuitry 62. During steady state operation (constant DC voltage), the inverter circuitry 62 is driven by constant width pulses. During transients, the DC voltage is reduced when electrical load 67 is increased or the DC voltage is increased when electrical load is reduced due to the delay in engine response time. When the DC voltage changes during such transients, the RMS voltage output from the inverter circuitry 62 is maintained constant by changing the inverter circuitry 62 control pulse width in response to variations in the DC voltage on the high voltage DC bus 48 until such time as the engine 43 is able to respond and either speed up or slow down as required to maintain the DC voltage on the high voltage bus 48 at 170 volts.

Figure 9:
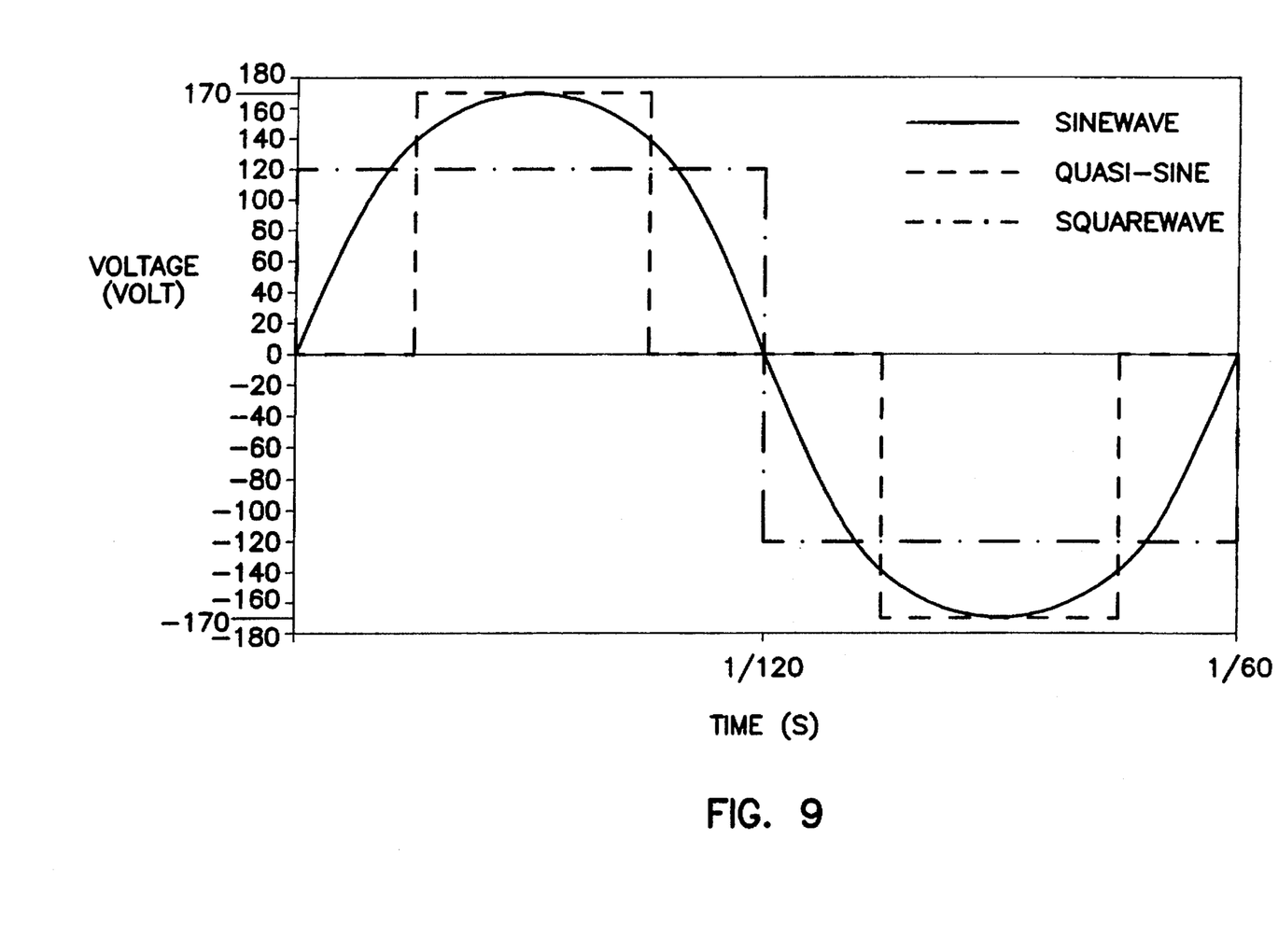
FIG. 9 is a graph of different voltage waves including a sinewave, a quasi-sine wave, and a squarewave superimposed over one another so as to illustrate the basic differences in each of the three types of voltage waves.

The inverter circuitry 62 includes a plurality of switching transistors 64 which invert high voltage DC, 170 volts, into a quasi-sine wave 65 as generally illustrated in FIG. 9. When the load 67 at the output of the inverter circuitry 62 is changed, the width of the quasi-sine wave 65 is changed accordingly because the engine speed cannot immediately be adjusted to maintain the high voltage DC power at the input of the inverter circuitry 62. This adjustment of the quasi-sine wave 65 output from the inverter circuitry 62, maintains AC RMS output voltage constant without changing the high voltage DC power.

Figure 10A:
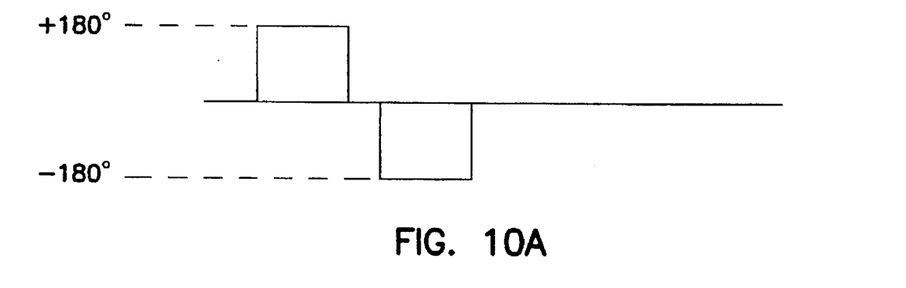
FIGS. 10A and 10B are graphs of a quasi-sine wave and a high frequency synthesized sine wave.
Figure 10B:
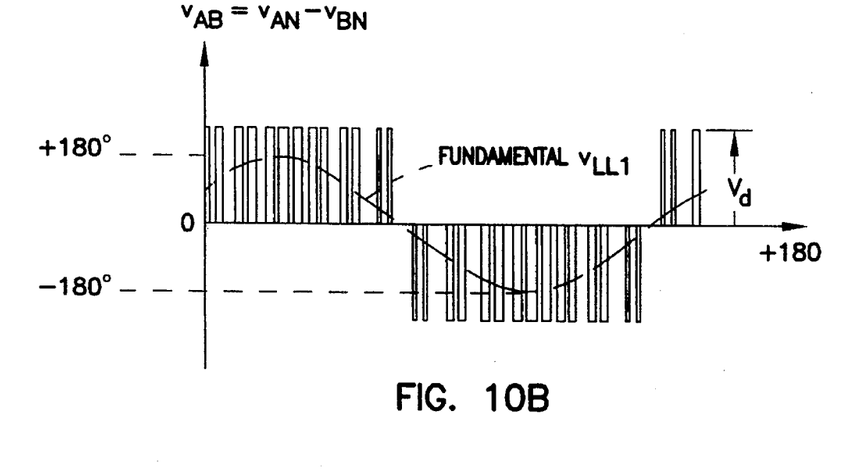
Figure 11:
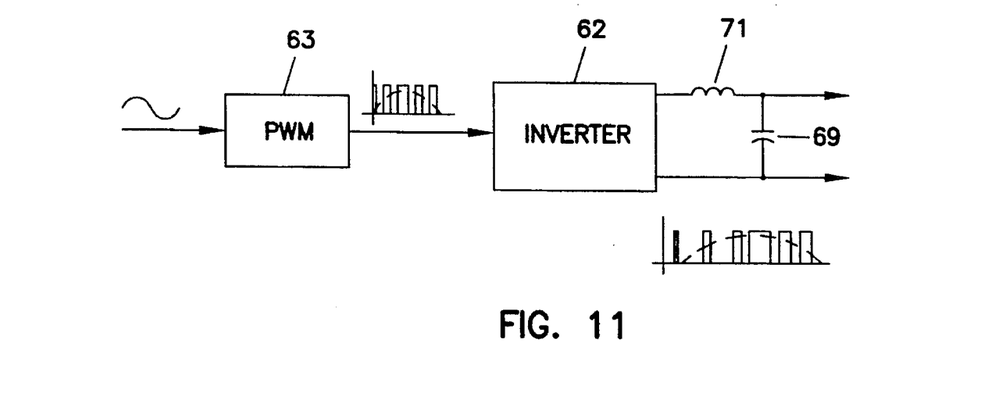
FIG. 11 is a block diagram of the input and output of an inverter circuit producing a high frequency synthesized sine wave.

In yet another embodiment, the inverter circuitry 62 is utilized as generally shown in FIG. 11 to produce a synthesized sine wave output. Pulse width modulated (PWM) circuitry 63 provides a pulse width modulated signal at 20,000 Hz to the inverter circuitry 62. The output of the inverter circuitry 62 includes an inductor 71 and capacitive bridge 69. As the load varies, the width of the pulse width modulated signal is varied to provide a synthesized sine wave output. The difference between a quasi-sine wave output and a synthesized sine wave output is generally illustrated in FIGS. 10A and 10B.

Further in FIG. 3, the storage batteries 42 are boosted from 12 volts to 170 volts AC power through a boost transformer 66. In the embodiment shown, the single-phase rectifier bridge 52 changes the 170 volts AC power output from the boost transformer 66 to 170 volts DC power which is sent on the high voltage DC bus 48 to the input of the inverter circuitry 62. The microprocessor based control system 70 controls boost control circuitry 50 which adjusts input to the boost transformer 66.

The microprocessor based control system 70 generates an engine speed control signal (PWM) to maintain the constant DC rail voltage, preferably at 170 DC volts. The PWM signal is generated by DC voltage sense circuitry 61 which monitors the DC voltage of the high voltage DC bus 48. This arrangement provides the variable engine speed system of the integrated power system 40 by speeding up or slowing down the engine 43 as the system power requirements change while maintaining the voltage on the high voltage DC bus 48 substantially constant at 170 DC volts.

Figure 6:
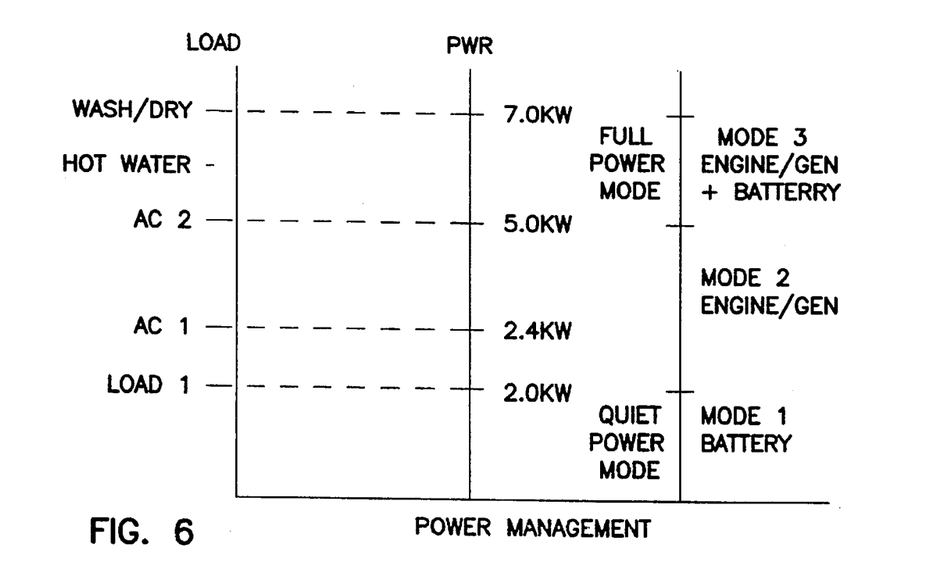
FIG. 6 is a power management graph of the different modes of operation of the integrated power system.

As illustrated in FIG. 6, there are two modes of the operation in the integrated power system wherein the batteries 42 are relied on as a power source. One is called "quiet power mode" in which the storage batteries 42 are the only power resource. Since the engine/generator 44 does not run during this mode, a quiet power is created. In one embodiment of the invention the "quiet power mode" provides up to 2.0 kw of steady state, continuous power and up to 2.4 kw of intermittent power.

The second mode is called "full power mode" in which both the storage batteries 42 and the engine/generator set 44 work together to provide power as required by the system.

This mode happens when there is an increase in the electrical load 67 applied to the output of the inverter circuitry 62. This might be a transient situation wherein the engine/generator set 44 isn't operating at full speed and has to increase its speed to maintain DC voltage on the high voltage DC bus 48 in which case the batteries 42 assist the engine/generator set 44 during this transient phase. This might also be a steady state situation wherein the system electrical load exceeds the engine/generator set 44 capacity in which case the batteries assist the engine/generator set 44 to increase the overall capacity of the integrated power system 40. In one embodiment, the full power mode provides 5.0 kw to 7.0 kw steady state, continuous power and up to 7.4 kw of intermittent power.

The voltage of the batteries 42 will preferably be boosted to provide 170 volts DC to the high voltage DC bus 48 under only two conditions: 1) the engine speed of the engine/generator set 44 is in the fixed or constant speed mode such as in mode 3 or when a change in the current at the output of the inverter 62 is detected by a current sensor 57 as greater than a predetermined amount, i.e. 42 amps. The later is a transient condition created by changing electrical loads on the system which create fluxuations in the current. The batteries 42 are never boosted to provide power to the high voltage DC bus 48 while being charged. Likewise, the batteries 42 are never charged at the same time they are boosted to provide power to the high voltage DC bus 48.

In the first mode, power is drawn from the storage batteries 42 to the transformer 66 through the boost control circuitry 50 having primary unidirectional transistors 50a switching at a high frequency. The output of the transformer secondary winding is rectified by the rectifier bridge circuitry 52 having diodes 52a resulting in 170 volts of DC power. A filter inductor circuit 74 is used to reduce current spikes during transistor switching in both the boost and charge modes. The inverter circuitry 62 uses an H-bridge configuration of field effect transistors (FET) 64 to alternatively switch the DC power to produce a quasi-sinewave output to the electrical load 67. Thus, the energy source of the first mode are the storage batteries 42 with DC-AC-DC conversion to get the constant high voltage DC power before the inversion to AC power by the inverter circuitry 62. The microprocessor based control system 70 controls the boost control circuitry 50 to maintain the proper step-up in power.

In the second mode, the storage batteries 42 are used as an additional power supply to engine/generator set 44. In the steady state situation, when the load exceeds the engine/generator 44 power capacity, the control algorithm of the microprocessor based control system 70 converts the engine speed from a variable speed mode to a fixed speed mode. Accordingly, the constant high voltage DC power at the input of the inverter 62 is not constant any more, and instead begins to decrease. At this time, the storage batteries 42 are utilized to keep the high DC voltage constant.

In the embodiment shown, the battery charging (converter) circuitry 54 has two power sources. One source is the engine/generator set 44, and the other source is the AC utility power 56. The engine/generator set 44 and the AC utility power 56 provide rectified DC power. The DC power is switched to AC power by transistors 54a of the battery charging circuitry 54 which creates an AC current to flow in the transformer winding #2 (secondary winding). By way of the turns ratio, winding #1 reduces the voltage, diodes 53a of rectifier circuitry 53 rectifies the AC current, and produces the current to charge the storage batteries 42.

The transformer 66 used during the charging is the same transformer 66 used during boost operation. Therefore, the battery boost and battery converter circuitry utilize a common transformer as bi-directional.

At initial start-up, the battery charging circuitry 54 output is regulated to 50 amps total. A constant current is held until the voltage reaches a temperature compensated 14.2 volts DC. The charging mode is then changed from current to voltage, and the voltage output is reduced to 13.6 volts DC (temperature compensated), whereby the charging operation continues at a lower rate. When current charging naturally reduces to less than 10 amps per battery, the voltage output is again reduced to 13.2 volts DC (temperature compensated) and held at this voltage as long as the battery charging circuitry is on. The final charge rate maintains the battery charge level if no other loads are consuming.

Steady State Operational Modes

Figure 8:
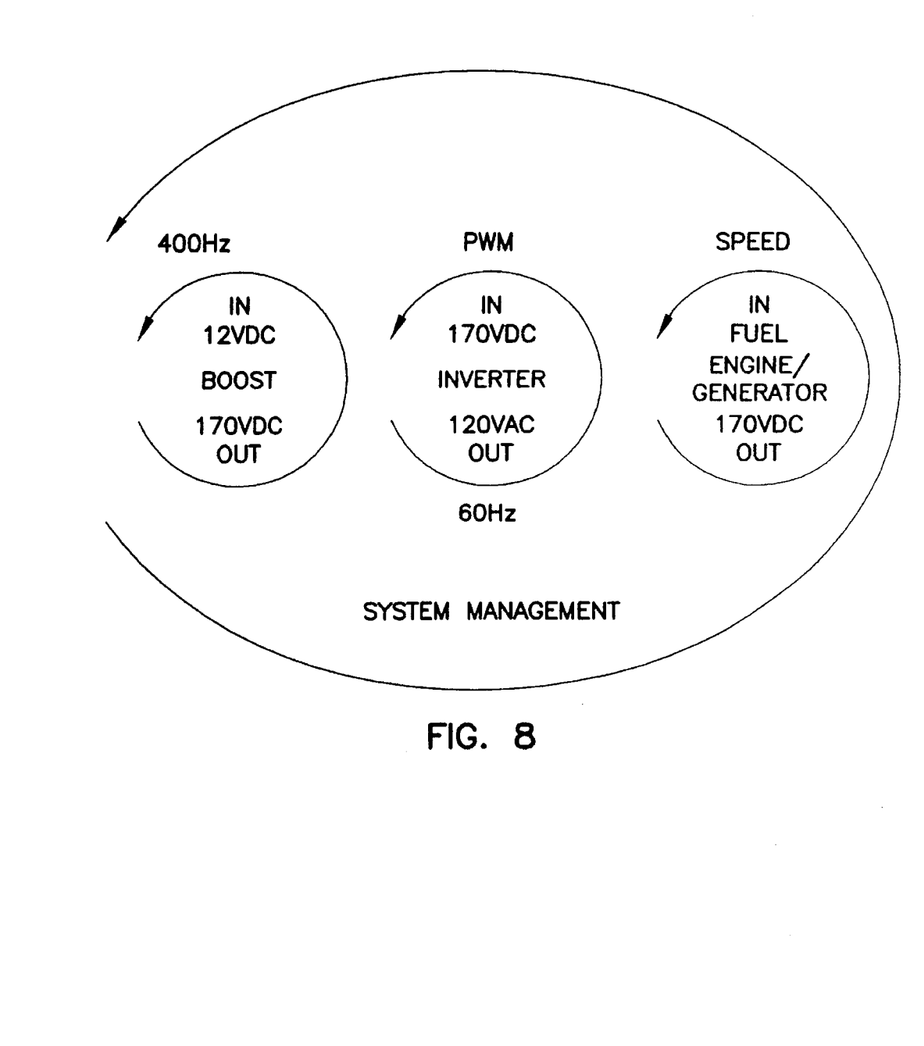
FIG. 8 is a functional view of an integrated power system in accordance with the principles of the present invention illustrating use of an engine/generator set and DC batteries to provide 170 volts DC to an inverter which provides household like power at 120 volts RMS AC/60 Hz for use by various electrical loads.

Referring to FIG. 6 and FIG. 8, various steady state operational modes will now be discussed for one embodiment of the invention.

Mode I:
1. Loads <2.0 kw (kilowatts); or
2. 2.0 kw <Loads <2.4 kw for less than 50% of time in proceeding 1 hour (through a temporary sensor); and
3. Battery condition >10 Volts DC.

In Mode I, the loads 67 of the system are low, and only the batteries 42 are used to provide the high voltage DC power. The engine/generator set 44 does not run. No battery charging is allowed with the batteries 42 being used as a source of power. Likewise, when the batteries 42 are being charged they are not used as a source of power.

Mode II:
1. Loads >=2.4 kw; or
2. 2.0 kw <Loads <2.4 kw for more than 50% of time in preceding hour; or
3. Battery condition is <=10 VDC (low battery); or
4. 2.4 kw <Loads <3.0 for greater than 30 seconds; or
5. Load demands >4.0 kw.

In Mode II, the loads 67 are higher than Mode I, and the power generated from the batteries 42 is not enough to satisfy the loads 67. The engine/generator set 44 starts to run. The batteries 42 provide enough electricity to start the engine/generator set 44. The battery boost is turned off, and the battery charging is turned on. This transition is seamless to any loads on the system such that there is uninterrupted AC power. The engine/generator set 44 is made to run at a speed which maintains 170 volts DC on the high voltage DC. The speed of the engine/generator set 44 is dependent on the electrical load 67 on the system 40.

Mode III:
1. Loads >5 kw.

In Mode III, the power which is generated only from the engine/generator set 44 is not enough to satisfy the electrical load 67. The operating speed of the engine is fixed at its maximum. The batteries 42 are boosted to supply additional power to the electrical load 67, and the battery charging is turned off. Accordingly, the power is generated from both the batteries 42 and the engine/generator set 44.

Transient State Operational Modes

When new loads are applied to the output of the inverter circuitry 62 or when loads are removed from the output of the inverter circuitry 62, a smooth system transient state is accomplished in the present invention. A smooth system transient state is required to reduce the voltage undershoot when the electrical load 67 is increased and to reduce the voltage overshoot when the electrical load 67 is decreased.

The following table shows ten transient state (five load on and five load off) operating conditions:

| | Pre transient | During transient | After transient |
|---|---|---|---|
| Current Load + <br> New Load << Gen <br> Max Load (LoadOn) | Mode 1 <br> Gen= N <br> Charge = N <br> Boost = Y | Gen = N <br> Charge = N <br> Boost = Y | Mode 1 <br> Gen = N <br> Charge = N <br> Boost = Y |
| Current Load + <br> New Load < Gen <br> Max Load (LoadOn) | Mode 1 <br> Gen = N <br> Charge = N <br> Boost = Y | Gen = V <br> Charge = N <br> Boost = Y | Mode 2 <br> Gen = V <br> Charge = Y <br> Boost = N |
| Current Load + <br> New Load < Gen <br> Max Load (LoadOn) | Mode 2 <br> Gen = V <br> Charge = Y <br> Boost = N | Gen = V <br> Charge = N <br> Boost = Y | Mode 2 <br> Gen = V <br> Charge = Y <br> Boost = N |
| Current Load + <br> New Load > Gen <br> Max Load (LoadOn) | Mode 2 <br> Gen = V <br> Charge = Y <br> Boost = N | Gen = V <br> Charge = N <br> Boost = Y | Mode 3 <br> Gen = F <br> Charge = N <br> Boost = Y |
| Current Load + <br> New Load > Gen <br> Max Load (LoadOn) | Mode 3 <br> Gen = F <br> Charge = N <br> Boost = Y | Gen = F <br> Charge = N <br> Boost = Y | Mode 3 <br> Gen = F <br> Charge = N <br> Boost = Y |
| Current Load − <br> Load Change < <br> Gen Max Load (LoadOff) | Mode 2 <br> Gen = V <br> Charge = Y <br> Boost = N | Gen = V <br> Charge = Y <br> Boost = N | Mode 2 <br> Gen = V <br> Charge = Y <br> Boost = N |
| Current Load − <br> Load Change < <br> Gen Max Load (LoadOff) | Mode 3 <br> Gen = F <br> Charge = N <br> Boost = Y | Gen = V <br> Charge = Y <br> Boost = N | Mode 2 <br> Gen = V <br> Charge = Y <br> Boost = N |
| Current Load − <br> Load Change > <br> Gen Max Load (LoadOff) | Mode 3 <br> Gen = F <br> Charge = N <br> Boost = Y | Gen = F <br> Charge = N <br> Boost = Y | Mode 3 <br> Gen = F <br> Charge = N <br> Boost = Y |
| Current Load − <br> Load Change << <br> Gen Max Load (LoadOff) | Mode 2 <br> Gen = V <br> Charge = Y <br> Boost = N | Gen = V <br> Charge = Y <br> Boost = N | Mode 1 <br> Gen = N <br> Charge = N <br> Boost = Y |
| Current Load − <br> Load Change << <br> Gen Max Load (LoadOff) | Mode 1 <br> Gen = N <br> Charge = N <br> Boost = Y | Gen = N <br> Charge = N <br> Boost = Y | Mode 1 <br> Gen = N <br> Charge = N <br> Boost = Y |

WHERE:
V = Variable Speed
F = Fixed Speed
Y = Yes (on)
N = No (off)

The five load on conditions will now be discussed:

When the current load is within the capacity of the boost and the battery condition is good (Gen Max Load), the engine/generator set 44 (Gen) is turned off. The power output of the batteries 42 is boosted to provide the system power requirements, and battery charging is turned off. At this time, if a new load is added and the total load is still within the capacity of the boost and the battery condition is good, then the engine/generator set 44, the battery charge, and the battery boost status during the transient and after transient remain the same as those before the transient.

If the current load and the new load are within the capacity of the boost but with little excess capacity to spare, and if before the transient, the engine/generator set 44 and the charge are off and the boost are on, then during the transient, the engine/generator set 44 starts and runs at variable speeds, the charge is off, and the boost is on. After the transient, the engine generator set 44 runs at variable speeds, the engine/generator set 44 charges the batteries, and the boost is turned off.

If the load condition is the same as above, but before the transient, the engine/generator set 44 runs at variable speed, the charge is on, and the boost is off, then during the transient, the boost is turned on to overcome the undershoots resulting from the load transient, and the charge is turned off accordingly. After the transient, the boost is turned off, and the charge is turned on. During and after the transient, the engine/generator set 44 keeps running at variable speed.

If, after adding the new load, the load is greater than the capacity of the engine/generator set 44, then the engine/generator set's running speed is changed from variable speed to a fixed speed, which is the engine/generator set's highest speed. At this time, the high DC voltage at the input of the inverter 62 cannot be kept constant anymore until the batteries 42 are boosted to keep the high DC voltage constant. Before the transient, the batteries are charged, and the boost is off. During and after the transient, the boost phase is on and the batteries are not charged.

If the load condition is the same as the fourth condition, and if the engine/generator set 44 runs a fixed speed and the batteries 42 have already been boosted, then during and after the transient, the load condition keeps the same as the condition before the transient.

The five load off conditions will now be discussed:

When the total current load is smaller than the capacity of the engine/generator set 44 after some loads are removed, and if the running speed of the engine/generator set 44 before the transient is variable, and the batteries 42 are being charged, then during and after the transient the engine/generator set 44 still runs the variable speeds, the boost is off, and the charge is on.

If the load condition is the same as the above condition, and before the transient, the running speed of the engine/generator set 44 is fixed and the batteries 42 are boosted, then during the transient, the charge is turned on to overcome the overshoots, and the running speed of the engine/generator set 44 is variable. After the transient, the batteries 42 are charged by the charging battery circuitry 54.

If the total load is still larger than the capacity of the boost after the transient (some loads are removed), and if before the transient, the running speed of the engine/generator set 44 is fixed, and the batteries 42 are boosted, then during and after the transient the batteries 42 are boosted, and the engine/generator set 44 still keeps its fixed speed.

If the total load after the transient is within the capacity of the boost and battery condition is good, and if before the transient, the running speed of the engine/generator set 44 is variable, and the batteries 42 are being charged, then during the transient, the engine/generator set 44 is turned off, but the batteries 42 are still charged to overcome the overshoots. After the transient, the batteries 42 are not charged but boosted to keep the high DC voltage constant.

If the load condition is the same as the above condition, and if before the transient, the engine/generator set 44 is turned off, then the batteries 42 are boosted both during the transient and after the transient. The batteries 42 are not charged.

The above ten transient-state operations illustrate the integration of the battery power source and the engine/generator set power source to provide seamless AC power to electrical loads of varying size. The microprocessor based control system 70 programmed with suitable control logic to enable these operations. The control logic for the integrated power system 40 controls and coordinates the interaction between the various components of the system. The control logic performs various functions during operation of the integrated power system 40 including the following functions:

System Initialization
System Start
Engine/Generator Control
Boost Control
Converter/Charge Control
System Test
Inverter Control
Faults and Shutdowns
Operating set points
System variables
Time delays The output voltage of the engine/generator set 44 is regulated by controlling the running speed of the engine/generator set 44. The minimum running speed of a reciprocating combustion engine 43 is preferably 1800 RPM, and the maximum running speed of a reciprocating combustion engine 43 is preferably 3600 RPM. It is appreciated that the minimum and maximum running speed can be varied.

The control logic monitors various parameters and shuts down the engine/generator set 44 if certain parameters are exceeded; for example:
1) the speed of the engine/generator set 44 exceeds a predetermined limit (overspeed controlling),
2) the output of the inverter circuitry 62 exceeds a predetermined limit (called chopper overvoltage),
3) the voltage output of the engine/generator set 44 exceeds a predetermined limit (called engine/generator overvoltage), or
4) the boost voltage at the input of the inverter circuitry 62 exceeds a predetermined limit (called booster overvoltage).

The control logic provides four control loops: the inverter control loop, the boost control loop, the battery charging loop, and the engine/generator control loop.

The boost will provide high DC voltage 48 to the system 40 when enabled. The magnitude of the high DC voltage 48 is controlled with a variable reference input provided by a microprocessor PWM output. In the system test control, the boost is allowed to be disabled and enabled manually. In normal operating mode, the boost is enabled when the engine speed control is in constant speed mode and the power demand exceeds engine/generator set 44 capacity.

The software further controls that the battery charge and battery boost are never enabled at the same time.

The inverter 62 outputs a pseudo-sinewave at 60 Hz using two output bits. One is for the positive half cycle, and the other one is for the negative half cycle. The voltage is regulated to 120 RMS VAC. The control logic insures that the inverter 62 is enabled any time adequate voltage is available at the high voltage DC bus 48. The software limits the duty cycle to 48 percent. Minimum duty cycle should be around 35 percent.

The software controls the battery charging/converting function in three operating modes:
1. Constant current charging mode:
   The software measures the battery voltage. If the battery voltage is over 10.5 VDC, the software instructs to begin a constant current charging mode. The software controls the maximum current not to exceed 50 amps DC. When the voltage is charged to 14.2 VDC, then the software controls the batteries 42 to go to the constant voltage mode.
2. Constant voltage charging mode:
   The batteries 42 are maintained charging at the voltage of 13.6 VDC until the charging current decays to less than 10 ADC for greater than 3 seconds. Then, the batteries 42 go to the maintenance voltage charging mode. If the charge current exceeds the maximum charge current for more than 3 seconds, the batteries 42 are switched back from the maintenance voltage charging mode to the constant current charging mode.
3. Maintenance voltage charging mode:
   The charging voltage is held constant at 13.2 V.

In one embodiment, the microprocessor's memory requirements include 500 bytes of RAM and 24K of ROM. Memory of a microprocessor 72 of the microprocessor based control system 70 is large enough to support the entire system and variables in down loadable memory or permanent memory. In one embodiment a Motorolla 86HC11 processor is utilized. The microprocessor's speed is capable of performing calculations for up to 4 closed loops in less than 6 milliseconds. The microprocessor's input/output (I/O) includes A/D channels, discrete inputs, discrete outputs, PWM outputs, output compares, and input compares. Alternatively, the microprocessor 72 allows all the system 40 functions in a single chip.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An integrated power apparatus, comprising:
   engine/generator means for providing a first direct current voltage output to a direct current voltage bus;
   inverter means for inverting direct current voltage of the direct current voltage bus to alternating current;
   battery means for providing a second direct current voltage output for the direct current voltage bus;
   charging means for charging the battery means;
   boost means for boosting the second direct current voltage output of the battery means to provide the direct current voltage bus with boosted second direct current voltage output; and
   control means for integrating the battery means and the engine/generator means according to a predetermined control logic, wherein the engine/generator means is off and the battery means is the exclusive source of power during a first electrical load condition, the engine/generator is the exclusive source of power during a second electrical load condition, the engine/generator means is the exclusive source of power and simultaneously charges the battery means during a third electrical load condition, the engine/generator means and the battery means both provide power during a fourth electrical load condition.

2. An apparatus in accordance with claim 1, wherein the control means includes a microprocessor means, the apparatus further includes sensing means for sensing AC voltage output of the inverter means and sending an electrical signal to the microprocessor means, the microprocessor means sending an electrical signal to the inverter means to maintain the required AC voltage.

3. An apparatus in accordance with to claim 1 including means for allowing the boosted voltage of the battery means to be supplied to the direct current bus when the boosted direct current voltage of the battery means is higher than the direct current voltage on the direct current voltage bus, and isolating the output of the battery means from the direct current bus when the boosted voltage of the battery means is lower than the voltage of the generator/set means.

4. An apparatus in accordance with claim 1, wherein the battery means is a set of 12-volt batteries.

5. An apparatus in accordance with claim 1, wherein the inverter means includes means for outputting a synthesized sine wave.

6. An apparatus in accordance with claim 1, wherein the battery charging means output is regulated to 50 amps with the output being maintained at a constant current until the voltage of the battery means reaches roughly a temperature compensated 14.2 volts DC, voltage output is then reduced to roughly a temperature compensated 13.6 volts.

7. An apparatus in accordance with claim 1, wherein the control means includes a microprocessor means, the apparatus further includes sensing means for sensing the direct current voltage at an input of the inverter means and transmitting an electrical signal representative of the sensed voltage to the microprocessor means for processing of the signal, the microprocessor means sending an electrical signal to the engine/generator for controlling engine/generator speed as required to maintain constant voltage.

8. An apparatus in accordance with claim 7, wherein the speed of the engine/generator means is increased in stair step fashion to maintain constant voltage in response to increasing electrical load.

9. An apparatus in accordance with claim 1, wherein the control means includes a microprocessor means, the apparatus further includes sensing means for sensing a charging current at an input of the battery means and sending an electrical signal to the microprocessor means, the microprocessor means sending an electrical signal to the charging means to control the charging of the battery means.

10. An apparatus in accordance with claim 9, wherein the control means causes controls the charging of the battery means in response to the charging current sensed by the sensing means.

11. An apparatus in accordance with claim 1, wherein the control means includes a microprocessor means, the apparatus further includes battery voltage sensing means for sensing the voltage of the battery means and sending an electrical signal to the microprocessor means.

12. An apparatus in accordance with claim 11, wherein the control means causes the battery charging means to charge the battery means upon the battery voltage sensing means sensing a predetermined low battery voltage.

13. An apparatus in accordance with claim 11, wherein the control starts the engine/generator means upon the battery voltage sensing means sensing a predetermined low battery voltage.

14. An apparatus in accordance with claim 1, wherein the control means includes a microprocessor means, the apparatus further includes sensing means for sensing current at the output of the inverter means and sending an electrical signal to the microprocessor means.

15. An apparatus in accordance with claim 14, wherein the control means activates the boost means upon the current sensor detecting a transient condition caused by the addition of an electrical load so as to overcome undershoots.

16. An apparatus in accordance with claim 14, wherein the control means activates the charging means upon the current sensor detecting a transient condition caused by the deletion of an electrical load so as to overcome overshoots.

17. An apparatus in accordance with claim 14, wherein the control means operates the engine/generator means at a fixed speed upon the current sensor detecting a predetermined electrical load.

18. A method of providing household-like AC power to electrical loads, comprising the steps of:

providing a first direct current voltage output to a direct current high voltage bus using variable speed engine/generator means, engine speed of the engine/generator means being varied to maintain constant voltage on the high voltage bus;

inverting the direct current voltage of the direct current voltage bus to alternating current using inverter means;

providing a second direct current voltage output to the direct current high voltage bus using at least one DC battery, including the step of boosting the second direct current voltage output from the DC battery;

charging the battery means using charging means, power for the charging means being provided by the engine/generator means; and integrating the battery means and the engine/generator means using control means according to a predetermined control logic, wherein the engine/generator means is off and the battery means is the exclusive source of power during a first electrical load condition, the engine/generator is the exclusive source of power during a second electrical load condition, the engine/generator means is the exclusive source of power and simultaneously charges the battery means during a third electrical load condition, the engine/generator means and the battery means both provide power during a fourth electrical load condition.

19. A method in accordance with claim 18, including the step of sensing current at an output of the inverter means and initiating boosting of the battery voltage upon detection of electrical load being added thereby eliminating undershoots and initiating charging of the DC battery upon detection of electrical load being deleted thereby deleting overshoots.

20. An integrated power apparatus, comprising:

engine/generator means for providing a first direct current voltage output to a direct current voltage bus;

inverter means for inverting direct current voltage of the direct current voltage bus to alternating current;

battery means for providing a second direct current voltage output for the direct current voltage bus;

charging means for charging the battery means;

boost means for boosting the second direct current voltage output of the battery means to provide the direct current voltage bus with boosted second direct current voltage output;

control means for integrating the battery means and the engine/generator means according to a predetermined control logic, wherein the engine/generator means is off and the battery means is the exclusive source of power during a first electrical load condition, the engine/generator is the exclusive source of power during a second electrical load condition, the engine/generator means is the exclusive source of power and simultaneously charges the battery means during a third electrical load condition, the engine/generator means and the battery means both provide power during a fourth electrical load condition;

sensing means for sensing the direct current voltage at an input of the inverter means and transmitting an electrical signal representative of the sensed voltage to microprocessor means for processing of the signal, the microprocessor means sending an electrical signal to the engine/generator for controlling engine/generator speed as required to maintain constant voltage;

sensing means for sensing AC voltage output of the inverter means and sending an electrical signal to the microprocessor means, the microprocessor means sending an electrical signal to the inverter means to maintain the required AC voltage;

battery voltage sensing means for sensing the voltage of the battery means and sending an electrical signal to the microprocessor means;

sensing means for sensing a charging current at an input of the battery means and sending an electrical signal to the microprocessor means, the microprocessor means sending an electrical signal to the charging means to control the charging of the battery means;

sensing means for sensing current at the output of the inverter means and sending an electrical signal to the microprocessor means;

the control means activating the boost means upon the current sensor detecting a transient condition caused by the addition of an electrical load so as to overcome undershoots; and the control means activating the charging means upon the current sensor detecting a transient condition caused by the deletion of an electrical load so as to overcome overshoots.

\* \* \* \* \*